United States Patent
Skubacz et al.

(10) Patent No.: US 7,895,212 B2
(45) Date of Patent: Feb. 22, 2011

(54) METHOD FOR ESTIMATING A PRESTIGE OF AN ENTITY

(75) Inventors: Michal Skubacz, Gröbenzell (DE); Peter Suda, München (DE); Cai-Nicolas Ziegler, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 486 days.

(21) Appl. No.: 12/069,169

(22) Filed: Feb. 7, 2008

(65) Prior Publication Data
US 2009/0150378 A1    Jun. 11, 2009

(30) Foreign Application Priority Data
Dec. 7, 2007    (EP) .................... 07023747

(51) Int. Cl.
*G06F 17/30*    (2006.01)

(52) U.S. Cl. .......... 707/748; 707/749; 707/750
(58) Field of Classification Search .......... None
See application file for complete search history.

(56) References Cited

U.S. PATENT DOCUMENTS
7,065,494 B1 *    6/2006    Evans .......... 705/10

* cited by examiner

*Primary Examiner*—Baoquoc To

(57) ABSTRACT

A method and an apparatus for estimating a prestige of an entity, as for example a firm, company or name, is disclosed wherein a score value is assigned to an entity as a function of an occurrence of terms associated with said entity in search results. The search results are obtained by searching an information space such as the internet. This enables, for example, companies or divisions, to infer their public standing from an analysis of search results obtained through internet search engines. It is possible to compare a plurality of entities with respect to each other in an automated fashion.

23 Claims, 3 Drawing Sheets

METHOD FOR ESTIMATING A PRESTIGE OF AN ENTITY

CROSS REFERENCE TO RELATED APPLICATIONS

This application claims priority of European Patent Office application No. 07023747.4 EP filed Dec. 7, 2007, which is incorporated by reference herein in its entirety.

FIELD OF AN INVENTION

The invention relates to retrieving and evaluating information from an information space. It is sometimes desirable to estimate the reputation of entities such as companies, corporations, organizations, persons or other from information provided by generally accessible information sources. A vast information source is, for example, the internet or the world wide web.

Conventionally, dedicated service providers perform market studies, for example, by calling customers and inquiring about their experiences with certain companies or their goods or services. However, such dedicated studies are very expensive and require a plurality of manual steps such as polling persons as information sources individually and structuring and analyzing retrieved perception data.

SUMMARY OF THE INVENTION

This disclosure presents methods and apparatuses for estimating or comparing a prestige score for entities. Specifically, a score value is assigned to an entity as a function of an occurrence of terms associated to said entity in search results. The search results, for example, can be obtained by searching an information space.

The method can be employed for estimating a public standing of a plurality of companies or for comparing different companies. According to an embodiment of said method information provided by generally available information sources are used. For example, among other, a corresponding method can be implemented by a computer or a computer program product that initiates an execution of such a method on a computer.

BRIEF DESCRIPTION OF THE DRAWINGS

In the following aspects and embodiments of the invention are described with reference to the figures in the drawings.

DETAILED DESCRIPTION

An embodiment of the invention, for example, can be used when two companies operating in comparable business areas have diversified product or services portfolios shall be compared. For marketing reasons it can be of interest to find out which company prevails in which product group or area over the other.

Conventionally, one would study the product awareness and prestige by dedicated market studies. This would include asking people will for their perception of the given brand, or investigating which brands consumers associate with the given product group or product class. For example, an outcome of such a study could be the conclusion that users associate the concept of "cell phone" or "mobile phone" rather with the brand or company name "A" than with another, like "B". This may be an indication for an increased prestige of A over B.

Because such direct polls of the perception of users, for example by telephone calls, require considerable effort, in one embodiment of a method for estimating a prestige score for an entity an information space such as the internet or world wide web is used for such data acquisition. In the internet information entities such as company names, trademarks, brand names, authors, parties and their products or services are readily available. For example, one can use search engines like Google™, Yahoo™, AltaVista™, MSN-search™ and the like for automatically obtaining information sources according to the search query. Usually search engines, like Google™, also provide for a ranking of the information sources in the respective hit list for a search result.

Figure 1:
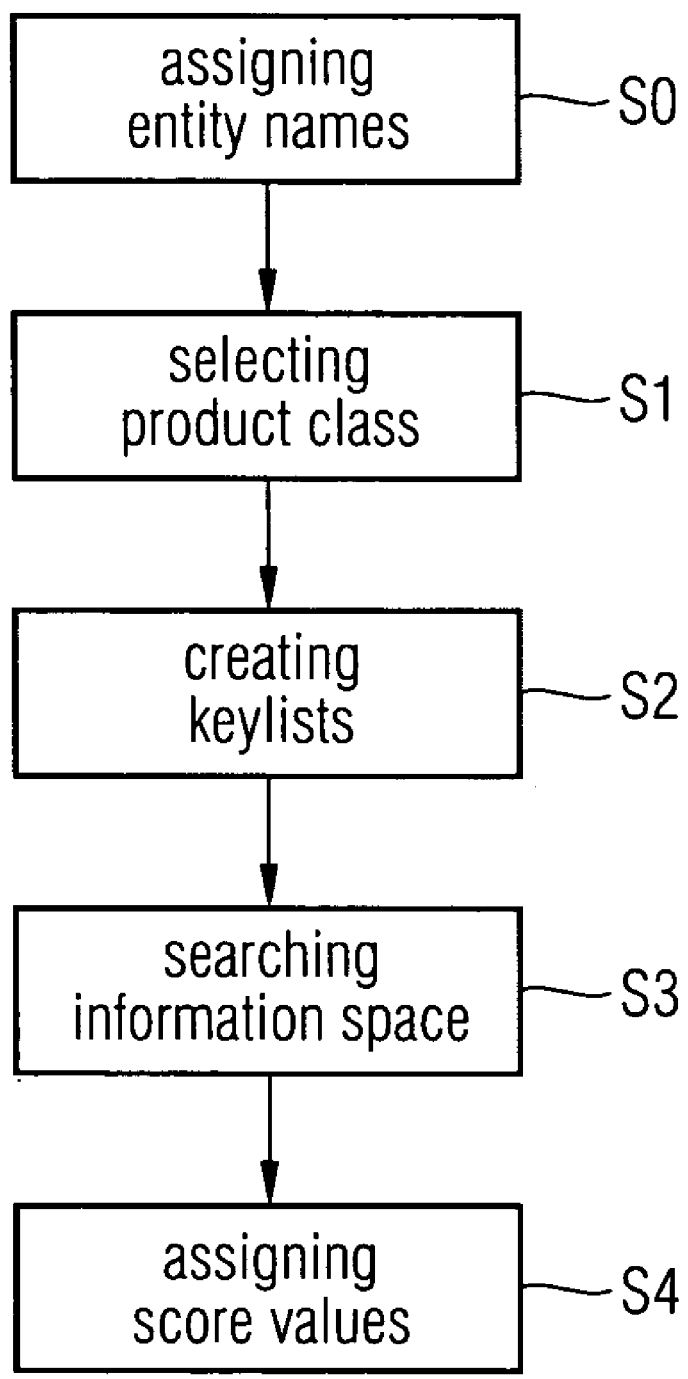
FIG. 1 shows an exemplary flow chart for a method according to one embodiment of the invention.

FIG. 1 shows a flow chart in an exemplary method for estimating a prestige score for one or more entities. For example, one may consider a company offering goods or services as an entity. However, "entity" may also stand for a variety of other objects, like company name, trademark, person or author.

In a first (optional) step S0 a name is assigned to the entities for which prestige scores are requested. A prestige score may refer to the reputation, prominence or importance of the entity. For example the name Siemens is assigned to the Siemens Corporation. When comparing or estimating a company's reputation, usually the company name can be used. If in a business area relating to computers, computer manufacturer companies are appropriate candidates for comparisons, for example IBM™, Hewlett Packard™ or Siemens™. Regarding mobile phones or cell phones, for example a comparison of Nokia™'s, Motorola™'s, Samsung™, and Siemens™ reputation or prestige can be determined.

In a next step S1, a product class defining a category of products or services that are offered by the entities, for example Siemens™ and IBM™ are selected. For example, said product groups or classes are explicitly listed in a list L. For example the list may comprise of cell phones, PDAs, MP3-players, computers and so forth:

L:={cellphone, PDA, MP3 player, computer, . . . }.

In a next step S2 a keyword list $L^A$ for each product group and company is created. For example, for a product group "cell phone" a list is specified that contains named entities and represent the two companies to be compared. If for example Siemens™ and IBM™ are to be compared with respect to the computer business a keyword list containing the name "IBM" and terms semantically relating to products by IBM with respect to computers are listed. If, for example, the list containing the genuses, i.e. category, class or group denominators, or general terms, like cell phone, PDA, or computer has N items, for each item in L two lists comprising key words or key phrases for each company A, B is created. The term genus refers to any category, class or group denominators For example, a list having key phrases, key words or representative terms for a given company like A=IBM™ reads:

$L^{IBM}$(computer):={IBM, ThinkPad, T43, . . . }.

For example, the representative term or key word ThinkPad™ is regarded as an endorsement for the company IBM™ in terms of the product group "computer".

An information space, as for example the internet, is then searched (step S3) for a product class name, like "computer".

As a result one obtains a search result, as for example, a list of information sources providing information on said product class in terms of its class name. In a specific example, a search result comprises a list of information sources, as for example web pages in the internet referring to a search term-"computer".

Figure 3A:
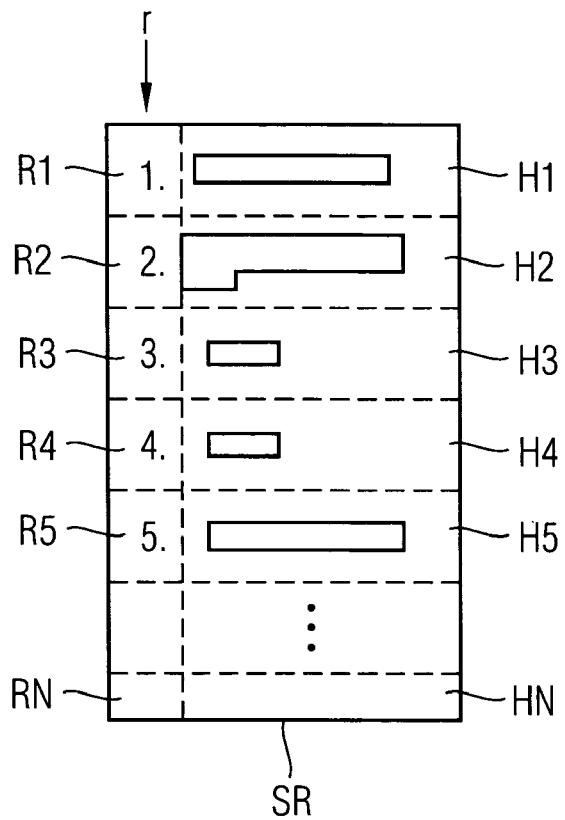
FIG. 3 shows illustrations of exemplary search results that may be used in one embodiment of the invention.

For example, readily available internet engines such as Google™, Yahoo™, AltaVista™, Ask.com™, MSN™ search, or others, may be employed. An illustration of a search result is for example shown in FIG. 3A. The exemplary search result SR is a list of entries H1-HN each referring to a web page containing information on the searched term. Each entry has a rank R1-RN that is assigned to the respective information source by the search engine.

Figure 3B:
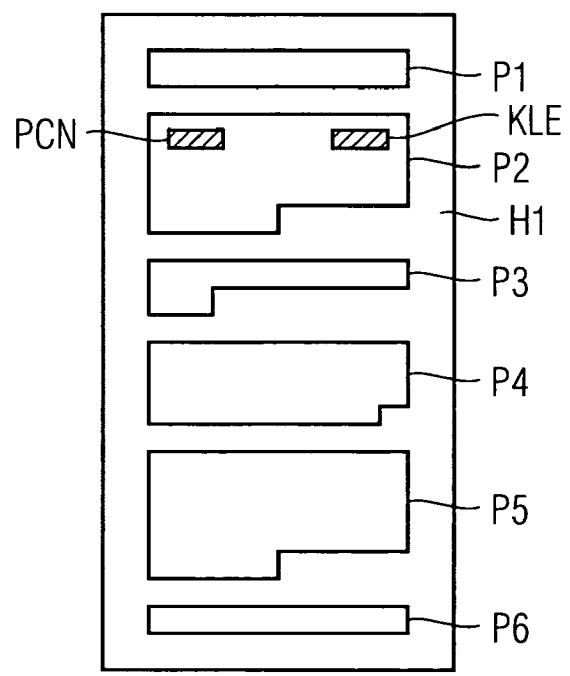

In the next step S4 (FIG. 1) a prestige score value is now assigned to a company name as a function of the rank r of an information source H1-HN and as a function of the occurrence of an entry of the key list KLE associated with said company in the same information source. This is illustrated in FIG. 3B. For example, a search query PCN for "computer" results in a hit list in terms of a ranked list of information sources, for example web pages. The web page H1 referring to the first entry in the hit list from the search result SR is a text document having six paragraphs P1-P6 as illustrated in FIG. 3B.

Now, the text is screened and automatically analyzed. One notices that in the second paragraph P2 the general term PCN=computer appears. In the same paragraph one of the key terms KLE of the key list associated with IBM is found. Hence, in hit H1 a product label associated with IBM in connection with the genus "computer" is very prominent. Therefore, a high prestige score value is assigned to IBM for the information sources H1. This procedure can be done for all entries of the hit list SR resulting in an assignment of score values to the entities (as for example IBM and Siemens) wherein a high score value is assigned to an entity if a product label associated with the company name occurs in the vicinity of the search term in the information source corresponding to the hit. The higher the rank of said information source in the search result SR the higher is the score value.

Additionally, in certain embodiments of the method for estimating a prestige score, a high score value is assigned to a company name if an entry of the key list of the company name is in close textual vicinity of the search term PCN. This is for example illustrated in FIG. 3B where both terms PCN and KLE occur in the same paragraph.

For recognizing the rank in the hit list or search result SR a weighting function w(r) can be defined. Moreover, if employing a plurality of search engines s an additional weight can be assigned to each search engine depending on the reliability of the search engine. The reliability may be defined manually, for example. A weighting function w assigns to each rank r in a search result an impact weight. Exemplary functions for impact waiting comprise linear weighting functions, but also weighting functions with an exponential decay are feasible. A linear function, for example, assigns to the first rank (r=1) the maximum weight, and the following ranks then decrease for example one by one:

$$w(r):=N-r;$$

where r=1, 2, 3, ..., N, and N is the number of entries considered. One may define a maximum number of hits, as for example, N=100, that are considered. In an exponential weighting function a cut-off $x_0$ can be employed:

$$w(r)=\exp(-x/x_0)$$

Other functions that perform a weighting of the search results can be employed. A waiting function usually gives higher relevance to highly ranked search results.

Hence, referring to FIG. 1 again, in step S3, for each product group or product class p in the list L a search query is submitted to at least one search-engine S where the query is given by the name of the product group, as for example "computer".

For assigning the score value in step S4 for all considered results, for example, only the first one hundred hits given by the search engine, the hit sources are read. For example, the corresponding information source being a textual web page is screened. Each information source, i.e. a web page, is assigned to one of the company names that are compared. The information source, i.e. the text document, is generally regarded as a hit if the product group name in focus appears in textual proximity to one of the relevant terms in the key list for the particular company name.

For example, if the product group being searched for is "computer", and the first resulting document having rank r=1 contains the searched term "computer" but also "ThinkPad" in close textual proximity, as illustrated in FIG. 3B, the top result (r=1) counts as a hit for the company IBM in the product group of "computers".

Now, all hits, or calculated score values, respectively, in the search results for each of the two companies, for example labeled as A and B, are counted. By assigning the hits in the search results to either company A or B, for example a list can be created in terms of:

$$H_A(\text{computer}, s) = \sum_{r \in H_C(computer, s)} w(r),$$

where C is an element of {A, B}, and $H_A$ is, for example $H_A$(computer, S)={1, 8, 38, 39, ...}. S stands for a particular search engine. As a result one obtains prestige scores for a given product group for each of the search engines. The latter equation is the sum of the impact factor weights of all the hit ranks.

For obtaining an overall prestige score for the given product group one can, for example, average over the number of search engines or, as mentioned above, also assign weighting factors to the search engines, i.e. very popular search engines, or search engines that are considered to be extremely reliable, would be assigned a higher impact score for their search results. Consequently, multiplying the prestigious search engine's results with its specific impact weight will lead to an improved overall prestige score for the entities.

Finally, one can compare the obtained prestige scores $H_A$ for a company A and a company B for a given product group, like "computer". As a result, the final prestige score may be used as an indication for a reputation or importance of the company with respect to a public opinion in the information space such as the internet.

Figure 2:
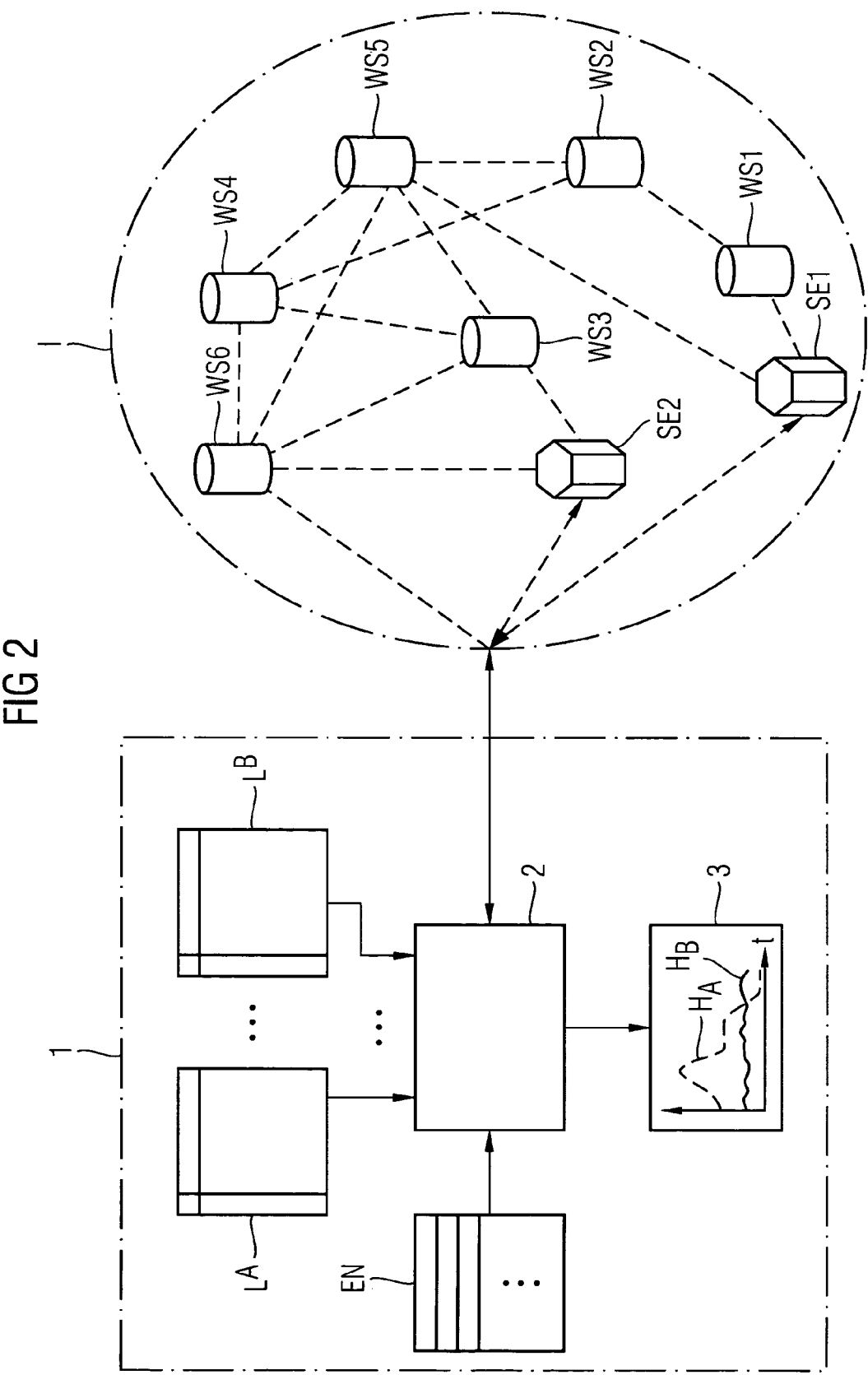
FIG. 2 shows a block diagram of a system for estimating prestige scores for entities according to an embodiment of the invention.

FIG. 2 shows a system for estimating a prestige score for an entity according to an embodiment of the invention. For example, the above mentioned method steps may be implemented by appropriate means of a computer, like, for example, means for assigning entity names, means for providing product class names, storage means for providing key lists, search means for searching information space and processing means for assigning the prestige score values. Such means may be implemented by appropriate program code but also as dedicated processing devices.

The system 1 for estimating or comparing the prestige of companies comprises a processing platform 2 which is communicatively coupled to the internet I. The processing platform 2, for example an appropriately configured computer, may receive a list of entities EN, for example names of companies to be compared with each other and key word lists $L^A$, $L^B$ comprising the respective company names A, B and terms being associated with the products or services of the respective company.

The processing platform submits search queries to search engines SE1, SE2 in the internet I wherein a search term comprises a product class name. The search engines SE1, SE2 provide for directories or indexes of web servers WS1-WSN and their content representing the Internet's content and return search results in terms of ranked hit lists, as for example shown in FIG. 3A, to the processing platform 2.

The processing platform 2 processes the search result data and assigns for each web page a score value to one of the companies A, B as a function of the rank r of the respective web page in the ranked list SR and as a function of the textual distance between the search product class name and one of the product labels in the key lists $L^A$, $L^B$, both occurring in the relevant web page.

A measure for the textual distance between the product class name and a product label in the web pages can be, for example, the occurrence in the same paragraph as shown in FIG. 3B. The textual distance, however, may also be defined in terms of the number of words between two phrases or words PCN and KLE. However, it may be an advantage if a maximum allowed distance between the product group name and the occurrence of a product label is fixed, for example, in terms of a maximum number of words in between.

For assigning the score values to the company names A, B the processing platform 2 executes, for example, a method as described with respect to FIG. 1. Additionally, processing platform 2 may estimate score values for the companies A and B over a predetermined time period t. As a result the prestige score or measure for reputation, prominence or importance of the company $H_A$, $H_B$ is shown as a function of time t. This is illustrated in FIG. 2 as box 3. From the time of elution of the score value $H_A$, $H_B$, for example, dedicated marketing specialist may infer to interrelations of the company's reputation with certain events in time.

It is an advantage of embodiments of the method and apparatuses disclosed that the prestige score may be obtained automatically, merely by submitting search queries to internet search engines and processing the search results according to an embodiment of the invention. Compared to traditional market research the embodiments of the invention provide a potential of cost savings because the conventionally necessary expensive human manpower is eliminated. Rather, an inexpensive automated information extraction and data aggregation is proposed.

The embodiments of the invention provide for methods and apparatuses for determining the prestige for a given product group company and search engine. The search engine's page impact ranking is inherently used. Although the invention is described with respect to certain embodiments, in particular for estimating the prestige of companies, the proposed strategy may be employed in various implementations. For example, instead of companies, persons or other named entities can be examined with respect to their prominence in an information space. Although, the internet is a widely used information space, other information sources building an information space, as news papers, text databases or other, may be likewise employed. For example, instead of using search engines for the internet dedicated databases, book searches or editor's catalogs can be used. While the examples above refer to key words or associated product labels, also key phrases comprising several distinct words or character strings may be used as identifiers for certain entities.

The invention claimed is:

1. A method for estimating a prestige score for an entity comprising:
    assigning an entity name to said entity using a computer processing platform;
    providing at least one product class of said entity to said computer processing platform;
    providing at least one keyword list for a combination of an entity and a product class to said computer processing platform, said keyword list having entries comprising said entity name and at least one term being associated with the product class of said entity;
    searching an information space for said product class using said computer processing platform for obtaining at least one search result for at least one search term, the search providing a ranked list of information sources providing information about said product class; and
    assigning a prestige score value to said entity using a function of a ranking of the information sources of the ranked list and an occurrence of an entry of the keyword list associated to said entity in at least one information source of said ranked list of information sources using said computer processing platform, wherein said assigned prestige score value is more prestigious for each occurrence of an entry of the keyword list in a predetermined vicinity of said entity name in the at least one information source of said ranked list of information sources.

2. The method of claim 1, wherein said assigned prestige score is also more prestigious for each occurrence of when an entry of the keyword list is in a predetermined textual vicinity of the at least one search term.

3. The method of claim 2, further comprising assigning a weight to each information source of the ranked list according to a weighting function.

4. The method of claim 3, wherein the weighting function depends on a rank of the information sources in said ranked list of information sources.

5. The method of claim 1, further comprising summing a plurality of prestige score values assigned to said entity for obtaining the prestige score for said entity.

6. The method of claim 1, further comprising screening each information source of the ranked list of information sources for at least one entry of said keyword list of said entity.

7. The method of claim 6, wherein the step of screening further comprises retrieving textual information from an information source.

8. The method of claim 1, wherein said information space is the world wide web or the internet.

9. The method of claim 1, wherein said entity is a person or a business.

10. The method of claim 8, wherein the step of searching comprises submitting a search query for a product name to a search engine.

11. The method of claim 8, wherein said information sources are text pages or web pages.

12. The method of claim 1, wherein the information sources are web pages and wherein the ranked list of information sources is a ranked list of hits referring to the web pages obtained from a search engine.

13. The method of claim 1, further comprising calculating or estimating a prestige score for the entity and for additional entities.

14. The method of claim 13, wherein for each entry of said list of information sources a score value is assigned to the entity and the additional entities.

15. The method of claim 1, further comprising monitoring the prestige score value over a predetermined time period.

16. The method of claim 1, wherein the entity is at least one of a company name, a trademark, a brand name, an author, and a party.

17. The method of claim 1, wherein the terms being associated with products of an entity are at least one of a product name, a service name, a serial number, an order number, a product code, and a part number.

18. A method for estimating a public standing of a plurality of companies, each of the companies having a company name, comprising:
   selecting a product class having a product class name using a computer processing platform;
   assigning to each company name of the companies a product keyword list comprising the company name and at least one product label associated with the respective company using a computer processing platform;
   submitting at least one search query to an internet search engine using a computer processing platform for obtaining a ranked list of web pages providing information on the searched product class name, said search query comprising said product class name,
   screening each of said web pages for textual information relating to said product class name and said product keyword list using a computer processing platform; and
   assigning for each web page a score value to each of the companies using as a function of a rank of the respective web page in the ranked list and a predetermined textual distance between the searched product class name and an entry of said keyword list in said textual information of the respective web page using a computer processing platform such that the assigned web page score value is more prestigious for each occurrence of an entry of said keyword list being identified within the predetermined textual distance.

19. The method of claim 18, wherein the product class is goods or services provided by the companies, and wherein the web page score for each web page is assigned so that higher ranked web pages provide more prestigious web page score values for each of the occurrences relative to lower ranked web pages.

20. The method of claim 18, wherein the textual distance is determined as a function of a number of words between an occurrence of the product class name and one of the product labels.

21. A computer device having a processing platform and a storage mechanism, the computer device for determining a prestige score for an entity comprising:
   the processing platform assigning an entity name to the entity;
   the processing platform providing at least one product class having a product class name;
   the storage mechanism providing at least one keyword list for a combination of an entity and a product class, said keyword list comprising the entity name and terms being associated with products of the respective entity for the product class;
   the processing platform searching an information space for a product class name for obtaining at least one search result as a ranked list of information sources providing information on said product class; and
   the processing platform assigning a prestige score value to the entity using a function of a ranking of the information sources of the ranked list and an occurrence of an entry of the keyword list associated to said entity in at least one information source of said ranked list of information sources, wherein said assigned prestige score value is more prestigious for each occurrence of an entry of the keyword list in a predetermined vicinity of said entity name in the at least one information source of said ranked list of information sources.

22. The apparatus of claim 21, wherein the computer device is a computer.

23. A computer having a computer program being implemented thereon to initiate an execution of the method of claim 1.

* * * * *